United States Patent [19]

Morgan et al.

[11] 3,830,062
[45] Aug. 20, 1974

[54] RANKINE CYCLE BOTTOMING PLANT

[75] Inventors: Dean T. Morgan, Sudbury; Jerry P. Davis, Concord, both of Mass.

[73] Assignee: Thermo Electron Corporation, Waltham, Mass.

[22] Filed: Oct. 9, 1973

[21] Appl. No.: 404,451

[52] U.S. Cl. .................... 60/618, 60/651, 60/671
[51] Int. Cl. ............................................. F01k 25/00
[58] Field of Search....... 60/36, 38, 11, 14, 39.18 B, 60/49

[56] References Cited
UNITED STATES PATENTS

| | | | |
|---|---|---|---|
| 1,230,617 | 6/1917 | Still | 60/38 UX |
| 2,370,949 | 3/1945 | Gaisberger | 60/49 X |
| 2,435,042 | 1/1948 | Johansson | 60/49 |
| 2,593,963 | 4/1952 | Biggs | 60/38 |
| 3,183,666 | 5/1965 | Jackson | 60/38 |
| 3,736,745 | 6/1973 | Karig | 60/36 |

Primary Examiner—Edgar W. Geoghegan
Assistant Examiner—H. Burks, Sr.
Attorney, Agent, or Firm—James L. Neal

[57] ABSTRACT

A primary power source rejects heat by means of its exhaust and its cooling system. A Rankine cycle engine includes a dual vapor generator system for simultaneously utilizing heat rejected by both the exhaust and the cooling system to vaporize a working fluid in a bottoming cycle. Subsequently, the vaporized working fluid is expanded to produce work.

10 Claims, 3 Drawing Figures

RANKINE CYCLE BOTTOMING PLANT

BACKGROUND OF THE INVENTION

The current energy crisis demands more efficient utilization of fuel in fossil fuel engines to conserve available resources. Current methods of conservation include recuperation and improvements in engine design, but these methods are limited in the extent to which they can significantly increase the efficiency of a fossil fuel engine. Environmental considerations also require more efficient energy producing systems and less thermal pollution.

All fossil fuel power generating systems reject large amounts of heat in combustion products. Some of this heat may be recaptured by recuperative preheating of fuels and air destined for combustion in the power generating system, but often most of the heat energy goes unused. Rankine cycle engines are usable in some applications as bottoming cycle engines to recapture this lost energy in an efficient manner by converting the heat energy into mechanical energy. The Rankine cycle engine may effect this energy conversion by using rejected heat from the primary power source to vaporize the working fluid. The vapor may then be expanded to perform work. Thereafter, working fluid is condensed and recirculated in the closed system.

SUMMARY OF THE INVENTION

This invention pertains to an efficient utilization of low temperature reject heat from a fossil fuel primary power source by using a Rankine cycle secondary power source as a bottoming cycle. The overall efficiency of a power generating system is thus improved by maximum utilization of rejected heat from the primary power source. Heat rejected from both the exhaust system and the coolant system is recaptured by means of a single Rankine cycle system comprising two vapor generators. Two vapor generators are used since the exhaust system has temperatures much higher than those in the coolant system and the working fluid heated by the exhaust system may be vaporized at a much higher pressure than that heated by the coolant system.

The load driven by the primary power source may be the same load driven by the secondary power source so that the secondary power source supplements the primary one or each power source may drive a separate load. Regeneration may be employed in the Rankine cycle system to produce more efficient operation. An organic working fluid is preferred since such fluids have low heats of vaporization, good entropy characteristics, and are non-corrosive.

This invention is especially suited for an electric power generating plant where the primary power source is a Diesel engine and the load is an electric generator. This invention can be adapted for large or small electric power generating requirements and very high overall plant efficiencies can be achieved.

DETAILED DESCRIPTION OF THE DRAWINGS

Figure 1:
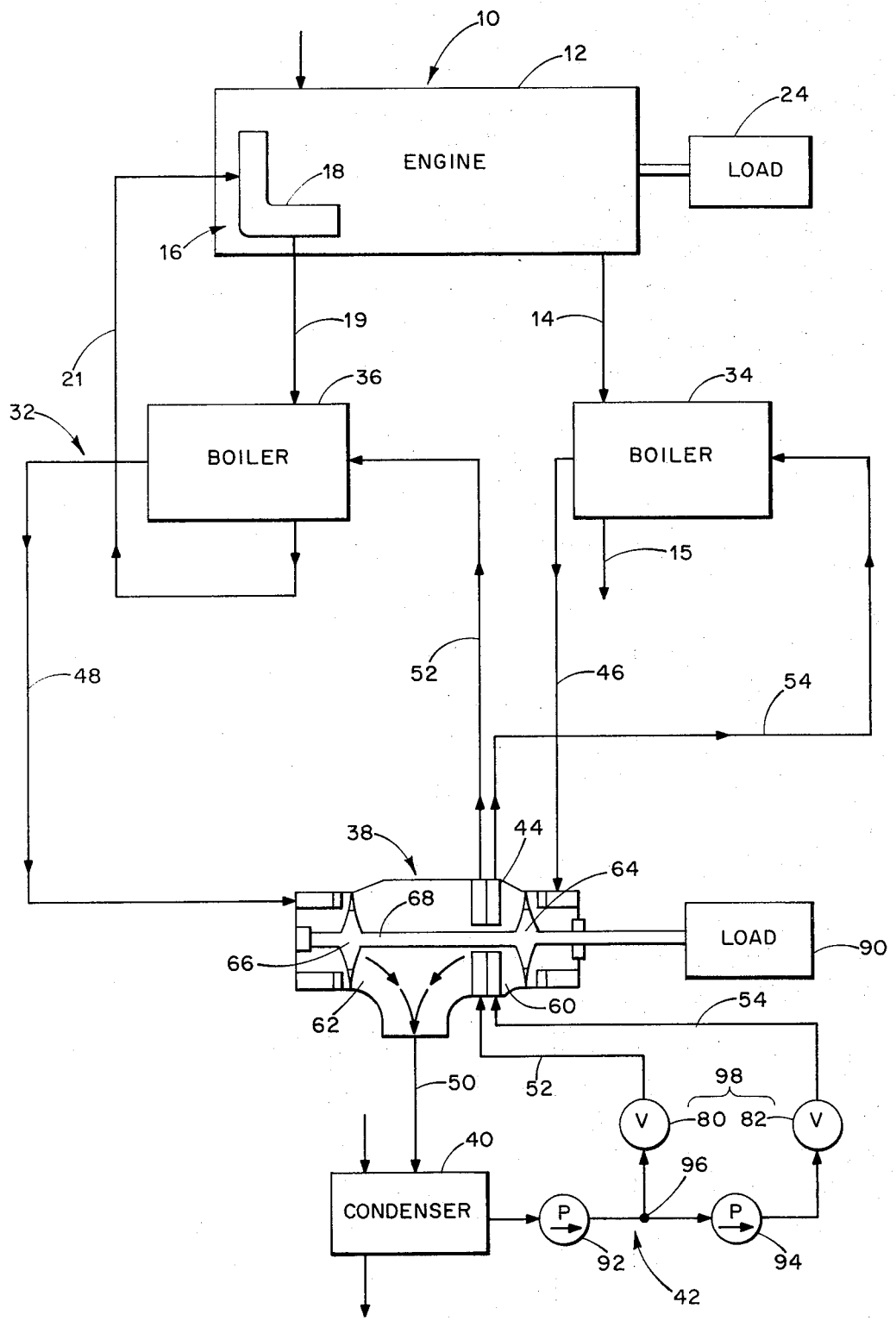
FIG. 1 is a schematic view showing a preferred embodiment of this invention.

Referring to FIG. 1, a primary power source 10 includes an internal combustion engine 12, for example a Diesel engine, an exhaust system 14 for removing combustion products from the engine 12, and a closed coolant system 16 for removing heat from the engine 12. The primary power source 10 drives a load 24 which may be an electric generator. The exhaust system 14 removes the combustion products from the engine 12 and transports them externally thereof. The coolant system 16 encloses a coolant fluid and comprises means 18 for confining such fluid in the engine, means 19 for transporting relatively hot coolant fluid away from the engine 12 and means 21 for returning relatively cool coolant fluid to the engine 12. The fluid in the coolant system 16 may be water or another suitable fluid.

A secondary power source comprises a closed Rankine cycle engine 32 including a high pressure vapor generator 34, a low pressure vapor generator 36, an expander 38, a condenser 40, a pump system 42, a regenerator 44, a first conduit 46 connecting the high pressure vapor generator 34 with the expander 38, a second conduit 48 connecting the low pressure vapor generator 36 with the expander 38, a third conduit 50 connecting the expander 38 with the condenser 40, a fourth conduit 54 connecting the condenser 40 to the high pressure vapor generator 34, and a fifth conduit 52 connecting the condenser 40 with the low pressure vapor generator 36.

The vapor generator 34 vaporizes a working fluid at relatively high pressure with the relatively hot combustion products from the exhaust system 14 as a heat source. An exhaust port 15 discharges cooled combustion products from the high pressure vapor generator 34. The vapor generator 36 vaporizes working fluid at a relatively low pressure with the relatively warm coolant fluid from the coolant system 16 as a heat source. The expander 38 receives vaporized working fluid from each vapor generator. The expander 38 is preferably a turbine having a high pressure side 60 for expanding vaporized working fluid from the high pressure vapor generator 34 and a low pressure side 62 for expanding vaporized working fluid from the low pressure vapor generator 36. The high pressure chamber 60 contains a first turbine rotor 64; the low pressure chamber contains a second turbine rotor 66; and both turbine rotors are connected to a common shaft 68. The turbine shaft 68 communicates with a load 90 such as an electric generator. The load 90 may be the same load 24 to which the primary power source 10 is attached or it may be a totally independent one. The regenerator 44 preheats liquid working fluid in conduits 52 and 54 using expanded vaporized working fluid. As shown in FIG. 1, the regenerator may be located in the expander 38 adjacent to the high pressure chamber 60.

The pump system 42, located between the condenser 40 and the regenerator 44, comprises two pumps, a low pressure pump 92, a high pressure pump 94, and a means 96 for regulating the flow of liquid working fluid. The low pressure pump 92 is adapted for drawing the liquid working fluid from the condenser 40 and directing it to the flow dividing means 96. The high pressure pump 94 draws one portion of the working fluid from the flow dividing means 96 and directs it toward the high pressure vapor generator 34. The other portion of the working fluid is directed to the low pressure vapor generator 36 by the low pressure pump 92. The means 98 for regulating the flow of liquid working fluid comprises a first valve 80 in the fourth conduit 52 for regulating the rate at which working fluid enters the low pressure vapor generator 26 and a second valve 82 in the fifth conduit 54 for regulating the rate at which working fluid enters the high pressure vapor generator 34. Alternately, the high pressure pump 94 may draw working fluid directly from the condenser 40 while the low pressure pump 92 also draws fluid directly from the condenser 40. With the pump in such parallel arrangement, the flow dividing means is not needed.

The working fluid in the secondary power source 30 may be any fluid with a boiling point of not less than 100°F or greater than 300° F at atmospheric pressure. Organic fluids are preferred. A preferred organic working fluid is Fluorinal 85, a mixture of 85 mole percent trifluoroethanol and 15 mole percent water, which is available from Halocarbon Products Corporation of Hackensack, New Jersey. This working fluid is preferred for basically three reasons: 1) a low latent heat of vaporization increases the external efficiency of the engine; 2) nearly isentropic behavior in the saturation portion of the vapor dome increases the internal efficiency of the engine; and 3) the noncorrosive nature of the fluid prolongs the life of the structural components of the engine. Other possible working fluids include a pyridine and water mixture, monochlorobenzene, and hexafluorobenzene.

Figure 2:
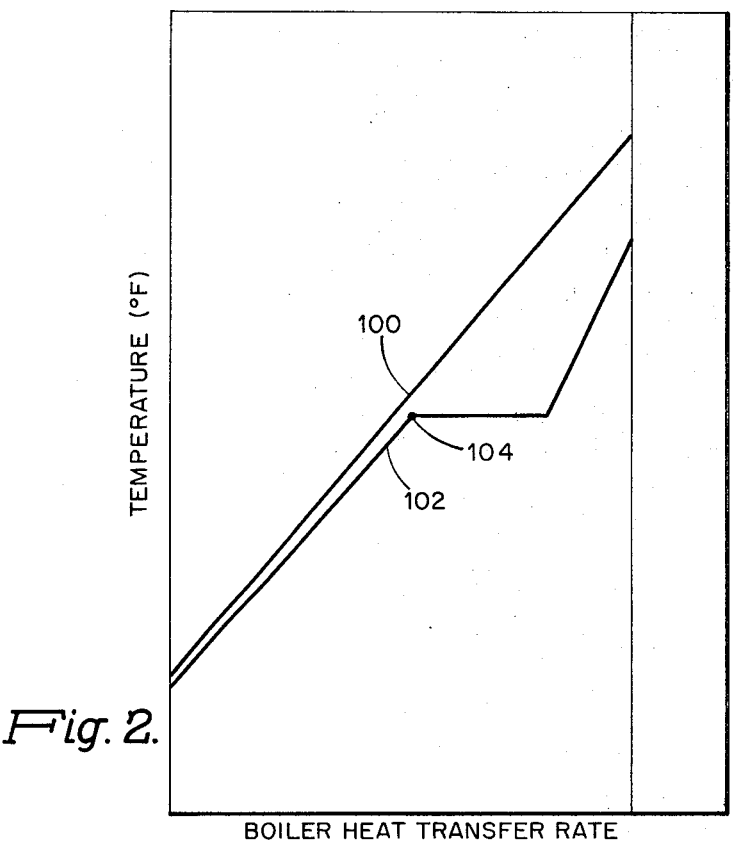
FIG. 2 depicts the heat exchange relationship of two fluids in a counterflow heat exchanger.

FIG. 2, which depicts the heat exchange process in a counterflow vapor generator, shows why a low heat of vaporization increases the external efficiency of the Rankine cycle engine 32. The upper line 100 is a plot of the temperature of the combustion products versus the percentage of total heat transferred from the combustion products to the working fluid remaining in the combustion products. The lower line 102 is a plot of the working fluid temperature versus the percentage of the total heat transferred which has been transferred to the working fluid. The difference between the combustion products temperature on line 100 and the working fluid temperature on line 102 at any value of the percentage on the abscissa is represented by the ($dT$). To obtain a completely reversible heat exchange process, ($dT$) should be zero, and to obtain the maximum external efficiency, the process must be reversible. If the process is irreversible, heat is lost to the system and not used to perform work.

For practical reasons, ($dT$) can never be zero since, as ($dT$) approaches zero, the size of the vapor generator must approach infinity. Thus, ($dT$) should be reduced to a minimum which is determined by the size requirements of the vapor generator. Ideally, this minimum should be maintained throughout the heat exchange process to obtain maximum efficiency. In practice, as shown in FIG. 2, as the temperature of the combustion products decreases linearly, the temperature of the working fluid increases linearly until vaporization occurs. The value ($dT$) decreases to its minimum just before vaporization of the working fluid occurs. The value of ($dT$) can be reduced to its minimum much more quickly by regeneration, which increases the temperature of the working fluid at the start of the heat exchange process. The point 104 at which vaporization of the working fluid occurs is called the pinch point 104. After the pinch point 104, the slope of the upper line 100 remains the same, but that of the lower line 102 goes abruptly to zero as the working fluid changes state and continues to absorb heat but at a constant temperature. After the change of state occurs, the slope of lower line 102 again abruptly assumes a positive linear value as the temperature of the working fluid again increases as it approaches that of the combustion products. When the change of state occurs, ($dT$) becomes larger. The greater the latent heat of vaporization of the fluid is, the larger ($dT$) becomes before the temperature of the working fluid again begins to increase. Since most organic fluids have a relatively low latent heat of vaporization, the values of ($dT$) occurring in the vapor generator of a Rankine cycle engine will generally be favorable to the creation of high external efficiencies.

Figure 3:
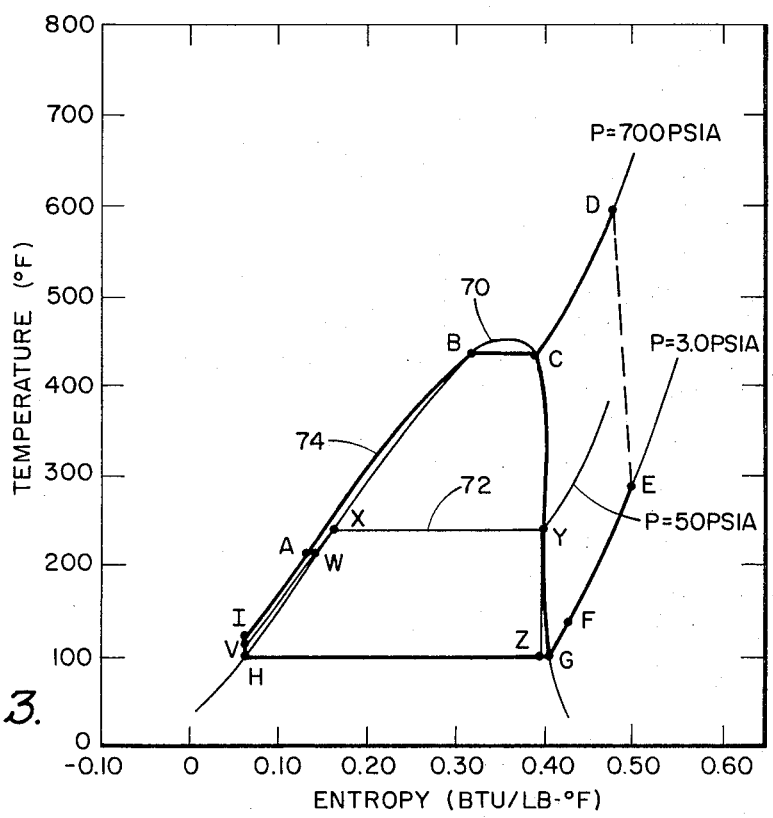
FIG. 3 is a temperature-entropy diagram associated with a preferred embodiment.

FIG. 3 is a temperature-entropy diagram for Fluorinal 85 showing that organic fluids result in high internal efficiency in a Rankine cycle engine. The curve 70 is the vapor dome for Fluorinal 85, while the curve 74 shows the operation of the Rankine cycle engine with Fluorinal 85 as a working fluid. The expansion step is represented by points D to E on the curve 74. As can be seen, the entire expansion step occurs outside the vapor dome. No condensation of working fluid occurs and no energy is lost in the system. If droplets had formed, because they would have a lower velocity than the vapor, turbine efficiency would be reduced.

Water, a typical inorganic fluid, has a more destructive effect on a Rankine cycle engine than do organic fluids. Liquid is formed in the expansion step and this tends to erode the expander 38 and necessitates its replacement from time to time. Also, water tends to react with many metals and corrode them, thus reducing the life of any metal parts in the engine. Most organic fluids will not corrode metals and, when no liquid forms in the expansion step, they do not erode the expander 38.

The operation of the secondary power source 30 is illustrated schematically by FIG. 1 and in FIG. 3 it is depicted as a function of the thermodynamic variables temperature and entropy when a trifluoroethanol and water working fluid is used. The upper curve 74 shows the portion of the cycle involving the high pressure vapor generator 34 while the lower curve 72 shows the portion of the cycle involving the low pressure vapor generator 36.

Relatively hot combustion products from the engine 12 are directed to the high pressure vapor generator 34 from the exhaust system 14. Combustion products pass into the high pressure vapor generator 34, while relatively cool liquid working fluid is entering the high pressure vapor generator 34 from the fourth conduit 54. (See point A in FIG. 3.) The combustion products pass into a counterflow heat exchange relationship with the liquid working fluid. The combustion products lose heat to the working fluid and are then exhausted through the exhaust port 15. The liquid working fluid is heated to its boiling point by the combustion products. (A–B in FIG. 3.) The working fluid is then vaporized at a constant temperature. (B–C in FIG. 3.) Further heating of the working fluid vapor by the combustion products super-heats the working fluid. (C–D in FIG. 3.) Thereafter, the vapor expands (D–E) in the chamber 60. Regenerative cooling is represented between E and F; condensation from F to H; pumping from H to I, and regenerative heating between I and A.

Typically, with a Diesel, combustion products enter the high pressure vapor generator 34 at a temperature of about 700° F and exit at a temperature of about 250° F, the temperature below which condensation of certain of the combustion products occurs. Working fluid, for example Fluorinal 85, enters the high pressure vapor generator 34 at a temperature of about 210° F in a liquid form and exits as a vapor at a temperature of about 600° F and a pressure of about 700 psia. The exit temperatures of both the combustion products and the working fluid may be varied to suit the requirements of the system by varying the flow rates of the working fluid and the combustion products. However, there are some limits to this variation. The exit temperature of the working fluid can never exceed the initial temperature of the combustion products. Further, because the combustion products begin to condense at temperatures below 250° F and corrode the high pressure vapor generator 34, the combustion products should preferably not be cooled below 250° F.

Simultaneous with the above process, vaporized coolant fluid from the coolant system 16 is directed by the means 19 to the low pressure vapor generator 36. Working fluid passes in heat exchange relationship with the vaporized coolant fluid. The vaporized coolant fluid 15 is cooled and condensed to form a liquid, and is returned to the coolant system by the means 21 where it is again heated by the engine 12. The working fluid in vapor generator 36 is heated to its boiling point (X in FIG. 3) and vaporized (X–Y). The working fluid is then expanded (Y–Z) in the chamber 62 of expander 38 and thereafter mixed with expanded working fluid from chamber 60. The fluid is condensed (Z–H), pumped to the regenerator (H–V), experiences regenerative heating (I–W) and is then heated to boiling (W–X) in the vapor generator 36. Typically, where the engine 12 is a Diesel and the coolant fluid is water, steam from the coolant system 16 at 250° F enters the low pressure vapor generator 36 and exits as liquid at 220° F. The working fluid typically enters the low pressure vapor generator 36 as a liquid at about 210° F and exits as vapor at a temperature of about 235° F and a pressure of about 50 psia.

Operation of the expander 38, condenser 40, pump means 42 and the regenerator 44 will now be explained in more detail in connection with FIGS. 1 and 3. The vaporized working fluid from the high pressure vapor generator 34 passes to the high pressure side 60 of the expander 38 where it rapidly expands, driving the first turbine rotor 64. This rapid decrease in pressure and corresponding increase in volume of the working fluid vapor is accompanied by a decrease in temperature of the vapor. The working fluid vapor enters the high pressure chamber at a temperature of 600° F and a pressure of 700 psia and exits the high pressure chamber at a temperature of 300° F and a pressure of 3 psia.

Working fluid vapor from the high pressure chamber 60 flows through the regenerator 44 and into heat exchange relationship with liquid working fluid from the condenser 40 where it loses much of its heat energy. This working fluid enters the regenerator 44 at a temperature of 300° F and a pressure of 3 psia and exits the regenerator 44 at a temperature of about 145° F and a pressure of 3 psia.

Simultaneously, vaporized working fluid from the low pressure vapor generator 36 passes to the low pressure side 62 of the expander 38 where it rapidly expands driving the second turbine rotor 66. This vapor also experiences a decrease in temperature as its volume increases and its pressure decreases. The vapor enters the low pressure side 62 at a temperature of 235° F and a pressure of about 50 psia and exits the low pressure side 62 at a temperature of 100° F and a pressure of about 3 psia.

The working fluid vapor from the regenerator 44 joins with working fluid vapor from the low pressure side 62 and the entire mass of vapor flow enters the condenser 40. The heat removing fluid is drawn through the condenser 40 in heat exchange relationship with the vaporized working fluid. Heat is transferred from the relatively hot working fluid to the heat removing fluid. The vaporized working fluid is first cooled to its boiling point at the pressure maintained in the condenser 40; then it is condensed to form a liquid. The condenser is maintained at a pressure of 3 psia, and the boiling point of Fluorinal 85 at that pressure is 100° F.

The pump system 42 then draws the liquid working fluid from the condenser 40 for return to both the high pressure vapor generator 34 and the low pressure vapor generator 36. The working fluid is first drawn into the pump system through the low pressure pump 92. It is placed under a slightly elevated pressure. The working fluid then enters the flow dividing means 96 where one portion of the flow is diverted to the low pressure vapor generator 36 and the rest of the flow is diverted to the high pressure pump 94 where it is placed under a higher pressure. The first valve 80 regulates the flow rate of working fluid to the high pressure vapor generator 34 and the flow to vapor generator 36 is regulated by the second valve 82.

After leaving the condenser 40, working fluid in the fourth conduit 54 and in the fifth conduit 52 passes through the regenerator 44. The working fluid in the fourth conduit 54 enters the regenerator 44 with a temperature of about 100° F and exits with a temperature of about 210° F, while the working fluid in the fifth conduit 52 enters with a temperature of about 100° F and exits with a temperature of about 210° F as well. Regeneration of the working fluid prior to its entry into the high pressure and low pressure vapor generators 34 and 36, respectively, increases the efficiency of the Rankine cycle engine 32, but is not essential to its operation. Engine efficiency will also be increased if only one of the conduits 52 or 54 passes through the regenerator 44.

If Fluorinal 85 is used as the working fluid, the greatest overall efficiency of the power source is obtained if the working fluid is regenerated to a temperature of about 210° F. This produces a value of ($dT$) in the high pressure vapor generator 34 as the working fluid enters of about 40° F and a value of ($dT$) in the low pressure vapor generator 36 as the working fluid enters of about 10° F. Thus, ($dT$) is minimized in both the high pressure vapor generator and the low pressure vapor generator, and the upper line 100 and the lower line 102 in FIG. 2 are almost parallel throughout the entire heat exchange process.

We claim:

1. In a power generating system comprising a primary power source and a secondary power source, the primary power source comprising an internal combustion engine, exhaust means for discharging hot combustion products from the internal combustion engine, and closed coolant means confining heat removing fluid in the internal combustion engine; the secondary power source comprising a Rankine cycle power system adapted for utilization of reject heat from the primary source; the Rankine cycle power system comprising:
   a. a high pressure vapor generator for vaporizing a working fluid at high pressure;
   b. first means for directing the hot combustion products from the exhaust means into heat exchange relationship with working fluid in the high pressure vapor generator;
   c. a low pressure vapor generator for vaporizing a working fluid at low pressure;
   d. second means for directing the fluid from the coolant means into heat exchange relationship with working fluid in the low pressure vapor generator;
   e. a single expander means for receiving vaporized working fluid from both the high and low pressure vapor generators and adapted to permit both working fluid vapor from the high pressure vapor generator and working fluid vapor from the low pressure vapor generator to expand and perform work simultaneously; and
   f. a condenser for liquifying vaporized working fluid from the high pressure vapor generator and the low pressure vapor generator.

2. The power generating system of claim 1 wherein the internal combustion engine is a Diesel and the working fluid used in the secondary power source, in the high pressure vapor generator and in the low pressure vapor generator, is an organic fluid.

3. The power generating system of claim 2 further comprising a regenerator in the secondary source for transferring heat from the gaseous working fluid from the high pressure vapor generator, after it departs the expander and before it enters the condenser, to liquid working fluid from the condenser destined for the high pressure generator.

4. A power generating system as defined in claim 2 wherein the expander comprises a turbine having one shaft and two rotors thereon, a first rotor comprising a reaction member for working fluid vapor from the high pressure vapor generator and the second rotor comprising a reaction member for working fluid vapor from the low pressure vapor generator.

5. A power generating system as defined in claim 4 comprising an electric generator driven by the turbine.

6. The power generating system of claim 1 further comprising a regenerator in the secondary source for transferring heat from the gaseous working fluid from the high pressure vapor generator, after it departs the expander and before it enters the condenser, to liquid working fluid from the condenser destined for the low pressure vapor generator.

7. A method of recovery of reject heat from a combustion producing, fluid cooled primary power source comprising the steps of:
   by means of reject heat from combustion products, vaporizing a mass of organic working fluid having a boiling point between 100° and 300° F at atmospheric pressure in a vapor generator;
   by means of reject heat from the coolant fluid of the primary source, vaporizing another mass of the same working fluid simultaneously in a second vapor generator;
   receiving simultaneously the vaporized working fluid from the first and second vapor generators;
   expanding the vaporized working fluid to produce work;
   condensing expanded working fluid;
   pumping liquid working fluid to the first vapor generator at one pressure; and
   pumping liquid working fluid to the second vapor generator at a second pressure lower than the one pressure.

8. The method according to claim 7 further comprising the step of preheating the liquid working fluid from the condenser destined for the first vapor generator by transferring to it heat from expanded working fluid from the first vapor generator.

9. The method according to claim 7 further comprising the step of preheating the liquid working fluid from the condenser destined for the second vapor generator by transferring to it heat from expanded working fluid from the first vapor generator.

10. The method according to claim 7 wherein the expander is a dual expansion chamber turbine and the expanding step further includes the steps of driving a rotor in one chamber of the turbine expander by means of vaporized working fluid from the first vapor generator and simultaneously driving another rotor in the other chamber of the turbine expander by means of vaporized fluid from the second vapor generator.

* * * * *